(12) United States Patent  (10) Patent No.: US 7,472,489 B2
Frank  (45) Date of Patent: Jan. 6, 2009

(54) ROWING DEVICE, DIGITAL PITCH METER AND OTHER DEVICES

(76) Inventor: Curtis Douglas Frank, 245 29th St., #3, Oakland, CA (US) 94611

( * ) Notice: Subject to any disclaimer, the term of this patent is extended or adjusted under 35 U.S.C. 154(b) by 0 days.

(21) Appl. No.: 11/684,296

(22) Filed: Mar. 9, 2007

(65) Prior Publication Data

US 2007/0209223 A1  Sep. 13, 2007

Related U.S. Application Data

(60) Provisional application No. 60/780,845, filed on Mar. 10, 2006.

(51) Int. Cl.
*G01C 9/06* (2006.01)
*G01B 7/30* (2006.01)
(52) U.S. Cl. .................. 33/530; 33/366.11; 33/534
(58) Field of Classification Search ............ 33/530, 33/366.11, 534, 1 N, 471
See application file for complete search history.

(56) References Cited

U.S. PATENT DOCUMENTS

| | | | | |
|---|---|---|---|---|
| 2,737,722 A | * | 3/1956 | Keim ........................ 33/286 |
| 3,996,670 A | * | 12/1976 | Joyal et al. .................. 33/530 |
| 4,551,921 A | * | 11/1985 | Puyo et al. ............... 33/366.14 |
| 4,852,266 A | * | 8/1989 | Whitman et al. ........ 33/366.11 |
| 5,163,228 A | * | 11/1992 | Edwards et al. ............. 33/1 N |
| 5,381,604 A | | 1/1995 | Heidel et al. |
| 5,488,777 A | | 2/1996 | Erdesky |
| 5,511,320 A | | 4/1996 | Heidel et al. |
| 6,104,480 A | * | 8/2000 | Matzo et al. ................ 356/148 |
| 6,192,595 B1 | | 2/2001 | Stewart |
| 6,385,857 B1 | * | 5/2002 | Weinberg et al. ........ 33/366.11 |
| 6,532,678 B2 | * | 3/2003 | Morgan ..................... 33/530 |
| 6,715,213 B2 | | 4/2004 | Richter |
| 6,836,972 B2 | * | 1/2005 | Drahos et al. ............ 33/366.11 |
| 6,871,413 B1 | | 3/2005 | Arms et al. |
| 6,880,258 B2 | * | 4/2005 | Adams et al. ................ 33/371 |
| 6,981,333 B2 | * | 1/2006 | Busch ........................ 33/645 |
| 2004/0186695 A1 | | 9/2004 | Aoshima et al. |
| 2006/0005408 A1 | | 1/2006 | Fernand |

* cited by examiner

*Primary Examiner*—Christopher W Fulton
(74) *Attorney, Agent, or Firm*—Whitham Curtis Christofferson & Cook, PC

(57) ABSTRACT

Electronic devices are provided to measure the angle between two arbitrary surfaces, using the local direction of gravity as an absolute direction reference. One case is an electronic device to measure the angle between the keel of a rowing shell and the oarlock pin.

4 Claims, 13 Drawing Sheets

ROWING DEVICE, DIGITAL PITCH METER AND OTHER DEVICES

RELATED APPLICATION

This application claims benefit of U.S. provisional application Ser. No. 60/780,845 filed Mar. 10, 2006.

FIELD OF THE INVENTION

This invention relates to measurement devices, especially to electronic measurement devices.

BACKGROUND

In rowing, proper assembly of the rowing equipment includes measurement of pitch. In other applications and contexts, pitch measurements also are needed.

The measurement of an angle relative to the local direction of gravity is commonly performed by electronic level and tilt meters available today. However, many applications require the measurement of the angle between two surfaces, neither of which is parallel or perpendicular to the direction of gravity (what construction trades call plumb or level, respectively). What is needed, and many applications require, is a reliable and accurate device which can measure the angle of one surface relative to another surface, even if those two surfaces are not physically attached or in close proximity to one another.

It is noted that patent literature includes the following:

U.S. Pat. No. 5,381,604 issued Jan. 17, 1995 to Heidel et al., titled "Angle measurement device employing angle sensor and electronics integrally formed on a printed circuit board."

U.S. Pat. No. 5,488,777 issued Feb. 6, 1996 to Erdesky, titled "Utility line angle measurement device."

U.S. Pat. No. 5,511,320 issued Apr. 30, 1996 to Heidel et al., titled "Angle measurement device employing angle sensor and electronics with lead circuitry integrally formed on a printed circuit board."

U.S. Pat. No. 6,192,595 issued Feb. 27, 2001, to Stewart, titled "Gauge for use with an instrument for measuring the pitch of an oar blade."

U.S. Pat. No. 6,715,213 issued Apr. 6, 2004, to Richter, titled "3D Angle measurement instrument."

U.S. patent publication no. 20040186695 by Aoshima, et al., published Sep. 23, 2004, titled "Body motion detection device, pitch meter, wristwatch-type information processing device, method for controlling thereof, control program, and storage medium."

U.S. Pat. No. 6,871,413 issued Mar. 29, 2005 to Arms et al., titled "Miniaturized inclinometer for angle measurement with accurate measurement indicator."

U.S. patent publication no. 2006/0005408 dated Jan. 12, 2006 by Fernand, titled "Multipurpose angle measurement tool."

It also is noted that sometimes "pitch" is used in certain literature with a different meaning than the term "pitch" herein.

However, conventional approaches for measuring pitch have been difficult to use, even for an experienced user. This ease-of-use problem is experienced, for example, by rowers (even experienced rowers) using conventional pitch meters. Several mechanical devices exist which can perform the angle measurement wanted, however, these mechanical devices generally rely on a spirit level to achieve their relative measurements, and are only accurate to how well the user can interpolate the scale on the device. These mechanical devices require great skill to obtain accurate and repeatable measurements.

SUMMARY OF THE INVENTION

The present invention addresses these unmet needs and problems by providing inventive devices to measure the angle between two arbitrary surfaces, using the local direction of gravity as an absolute direction reference, such as, e.g., a device to measure the angle between the keel of a rowing shell and the oarlock pin, and other inventive devices. The inventor has invented an electronic device which measures the angle between two arbitrary surfaces, using the local direction of gravity as an absolute direction reference, such as, e.g., a device to measure the angle between the keel of a rowing shell and the oarlock pin.

In a preferred embodiment, the invention provides an electronic method of measuring an angle, comprising: (a) visually identifying a to-be-measured angle, wherein the angle is between a first surface (such as, e.g., a non-body surface) and a second surface (such as, e.g., a non-body surface), neither surface being parallel or perpendicular to direction of gravity; and (b) applying an electronic device (such as, e.g., an electronic pitch meter; an electronic device clampable or clamped by the user in a rowing application onto the pin leaving the user two hands free to adjust the rigging; etc.) to electronically measure the to-be-measured angle (such as, e.g., an angle that is in rowing equipment; etc.); such as, e.g.: an inventive method wherein the first surface and the second surface are not physically attached or in close proximity to each other; an inventive method wherein stern pitch and/or lateral pitch of rowing equipment is measured electronically; an inventive method wherein pitch in helicopter rotors is measured electronically; an inventive method wherein fan blade pitch is measured electronically; an inventive method wherein the electronic device is clamped by the user leaving the user two hands free; an inventive method in which an actual angle of a surface is measured using gravity as a reference followed by a comparison to another surface; an inventive method wherein the electronic device is a device in which gravity is set as a reference which is a common direction against which both surfaces are measured; an inventive method wherein only a single acceleration sensor is used; and other inventive methods.

In another preferred embodiment, the invention provides a pitch meter, comprising a physical structure insertible into a to-be-measured angle in rowing equipment, wherein the pitch meter is electronic.

The invention in a further preferred embodiment provides a pitch meter, comprising a physical structure insertible into a to-be-measured angle in a piece of equipment selected from the group consisting of: rowing equipment; helicopter rotors; fan blades and an automotive vehicle; wherein the pitch meter is electronic.

A particularly advantageous feature that may be provided by inventive pitch meters in certain embodiments is that their use comprises clampability by a user leaving the user two hands free.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 9:
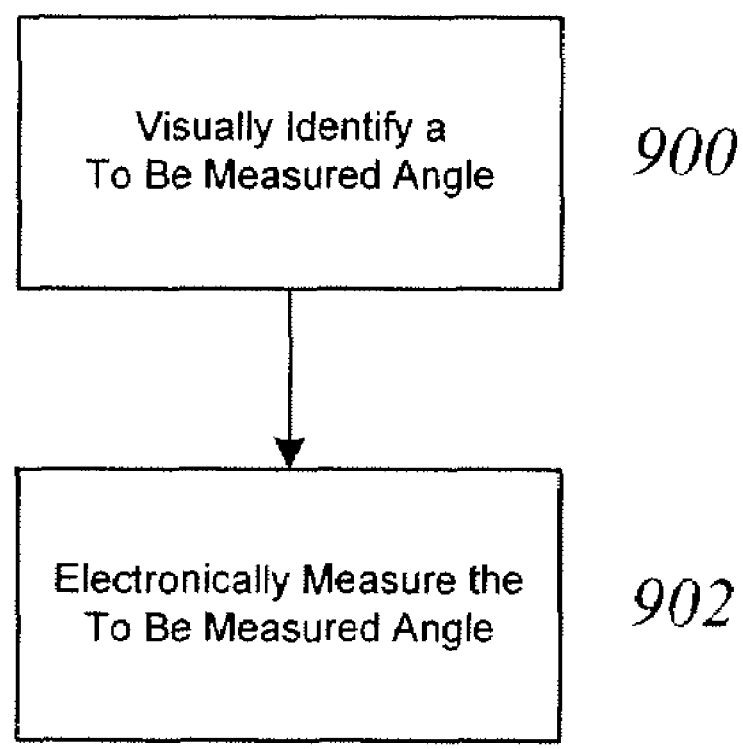
FIG. 9 is a block diagram of an inventive method in an exemplary embodiment.

An inventive electronic method of measuring an angle may be appreciated with reference to FIG. 9, where the method comprises a first step of visually identifying 900 a to-be-measured angle (such as, e.g., a to-be-measured angle that is between a first surface and a second surface, neither surface being parallel or perpendicular to direction of gravity) followed by a step of electronically measuring 902 the to-be-measured angle (such as, e.g., applying an electronic device to electronically measure the to-be-measured angle).

Herein "visually identifying" means visual identification by a user using his usual human eyesight without further correction beyond any glasses, contact lens or the like that he wears in his everyday life. Visually identifying includes a human looking and seeing the two surfaces, individually, with usual eyesight; however, one is not required to be able to see both surfaces at the same time. That one need not be able to see both surfaces at the same time can be seen by considering FIG. 1. The keel is usually out of sight in the view shown, and you know that there is an angle between the pin and keel, even though you cannot see it, or the two surfaces which define the angle at the same time.

The meaning of "first surface" herein is to refer to a "reference surface" or "cardinal surface", namely, a surface against which subsequent measurement(s) are compared against. The meaning of "second surface" herein is to refer to a surface or surfaces of interest. A "surface" herein refers to a surface on a macroscopic level of a size visible to a human being at about arm's length.

The invention may be used, e.g., to construct an electronic pitch meter. "Pitch" as used herein means the angle between a reference surface (e.g., the gunwale on a boat) and the to-be-measured surface (i.e., the oarlock pin). In the invention, a reference (with a preferred example of a reference being gravity) is used to set a common direction against which both surfaces are measured.

Figure 2:
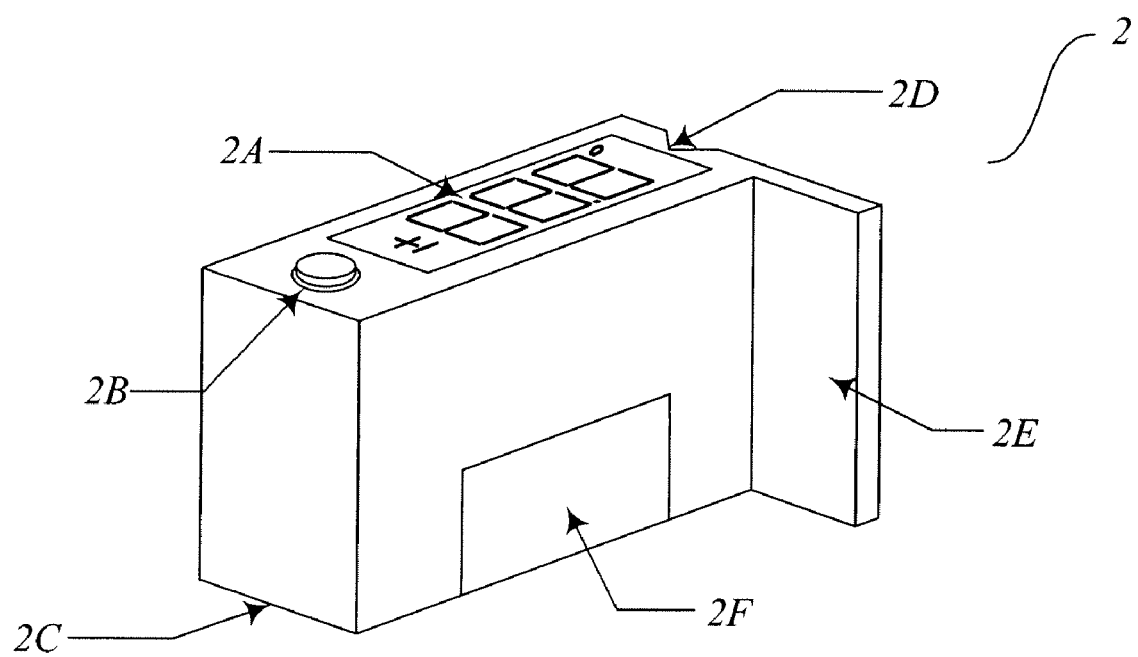
FIG. 2 is a perspective view of an electronic measurement device 2 according to an exemplary embodiment of the invention.

An example of an electronic device used in the invention to electronically measure the to-be-measured angle is the device 2 in FIG. 2. When used in a rowing application, preferred dimensions for device 2 are, e.g., ~3 inches long, 2 inches tall and one inch thick. Device 2 has LCD display 2A and button 2B for user interface shown on top. The device 2 rests on the bottom, 2C. On one end of device 2 is a triangular notch, 2D, which in a rowing application is placed against the pin. A tab 2E is provided to place against the oarlock in a rowing application. Device 2 includes a door 2F for a battery compartment.

Figure 3:
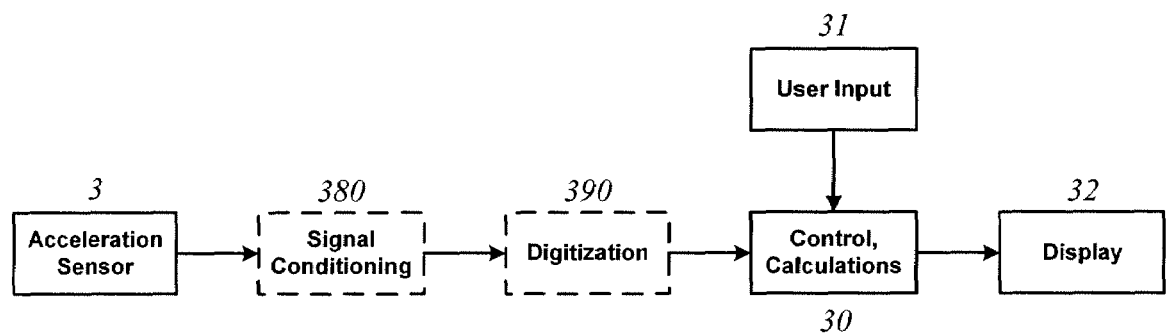
FIG. 3 is a functional diagram of an electronic design useable in an exemplary embodiment of the invention.

An example of electronic design useable in the invention is shown in FIG. 3. Using the functional diagram (FIG. 3), an inventive gravity referenced, electronic relative angle measuring device may be constructed. The beginning of the detection process is an acceleration sensor 3 which is a device sensitive to acceleration. In FIG. 3, signal conditioning 380 and digitization 390 are optional, depending on the output characteristics of the acceleration measuring device. The signal produced by the acceleration sensor 3 device, if analog, may need conditioning 380 before digitization 390. On the other hand, if the output of the acceleration detection device 3 is digital, the signal conditioning 380 and digitization 390 steps are unnecessary. The digital signal is then interpreted and calculations 30 performed by a microprocessor, which sends the results to a display unit 32. The microprocessor looks for signals from a user input device 31, which indicates various operation modes.

Acceleration sensor. The acceleration sensor 3 may be suitably selected according to the application. For example, in the case of a device to measure the stern and lateral pitch of the pin of a flat-water rowing shell, a preferable device is a small, battery-powered device and a preferable acceleration sensor is an acceleration sensor which is sensitive in the range from ±1 g. Preferably, the acceleration sensor should be able to be dropped and survive shocks on the order of $10^4$ g without being destroyed. Preferably, the inventive measurement device for use in a rowing application should be able to be powered by a 3V single supply, consume a minimum or power, and be able to respond to time-varying accelerations on the order of 10 Hz (minimum). The output signal can be either analog or digital, and its choice is considered more an economic, than an engineering decision. An example of an acceptable acceleration sensor is the ADXL322 manufactured by Analog Devices, Inc. For the rowing application, the acceleration sensor should be oriented such that when the inventive device is placed on its bottom, 2C, the acceleration sensor provides its most sensitive output response.

Signal conditioning. Signal conditioning 380 (FIG. 3) is unnecessary if the output of the acceleration sensor 3 is digital. In the case where the acceleration sensor 3 output signal is analog, that signal may need conditioning to both scale and center the response as required by the digitization 390 step. In this case, an operational amplifier with similar performance characteristics (3V single supply, minimum power consumption, 10 Hz minimum response) is required. The op-amp should also have rail-to-rail output response. An example of such an op-amp is the MCP6001/2/4 manufactured by Microchip Technology, Inc.

Digitization. Digitization 390 (FIG. 3) is unnecessary if the output of the acceleration sensor 3 is digital. In the case where the acceleration sensor output signal is analog, the signal should be digitized by an Analog to Digital Converter (ADC) before calculations are performed. The ADC should have performance characteristics similar to previous components (3V single supply, minimum power consumption, 10 Hz minimum response). Additionally, the ADC should have a 10 bit binary conversion accuracy. Typically, ADC's are built into many microprocessors, and a separate device is not necessary. An example of such a microprocessor is the Zilog Z8 Encore! family of microprocessors, which use a sigma-delta approximation technique.

Control, calculations. Referring to the control, calculations step 30 in FIG. 3, the microprocessor must be able to perform calculations to convert ADC counts to an inclination angle, then take the difference between a stored angle and the current angle. It must also be able to perform calibration routines, take input 31 from the user to switch between different operational modes, and control power usage by the device. As previously mentioned, the Zilog Z8 Encore! family of microprocessors have the necessary characteristics, including 10-bit ADC, digital I/O, flash memory and a variety of other peripherals required to control the device. This family also operates on a 3V single supply, and has various low power modes available.

Display. The display 32 unit (FIG. 3) should be selected according to the application. In the case of a rowing application: The display 32 must be easily viewable in daylight and optionally lit to be viewable at night. It must also be powered by 3V and consume a minimum of power. It should have three digits of accuracy, along with a "+", "−", "°", decimal point between the second and third digits and a low battery indicator. The ideal device for this rowing application is a Liquid Crystal Display (LCD) as display 32.

User input. The user input 31 should be selected according to the application. In the case of a rowing application: A simple user interface is required. A single, normally open push-button switch can be used to indicate user action, along with programming of the microprocessor to detect length of time the switch is activated.

Operating Principles

The physics and mathematics related to the functioning of an inventive device are as follows.

Figure 4:
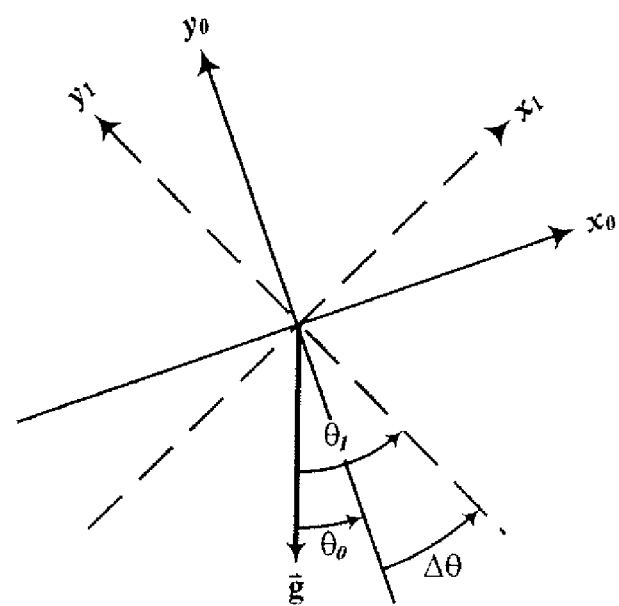
FIG. 4 is a graph relating to an operating principle of an inventive relative angle measuring device, using gravity as for direction reference. The relative angle between two surfaces, $\Delta\theta$, is the difference in angle between the perpendicular to the reference surface, $y_0$, and gravity, g, and the perpendicular to the surface of interest, $y_1$, and gravity.

Calculation of Relative Angle. The measurement of the angle between two separated surfaces must have a common reference direction. Preferably gravity is chosen as that reference, as shown in FIG. 4. One further defines two sets of axes. The first, $(x_0, y_0)$ is aligned with the reference surface and $(x_1, y_1)$ aligned with the surface of interest. The amount a surface is inclined, relative to gravity, is the angle between the gravity vector, g, and y-axis aligned with that surface. These inclination angles are denoted with $\theta_0$ and $\theta_1$. Finally, one defines positive rotations to be counter-clockwise.

With these definitions, the relative angle between these two arbitrary surfaces is given by $$\Delta\theta = \theta_1 - \theta_0 \tag{6-1}$$

Figure 5:
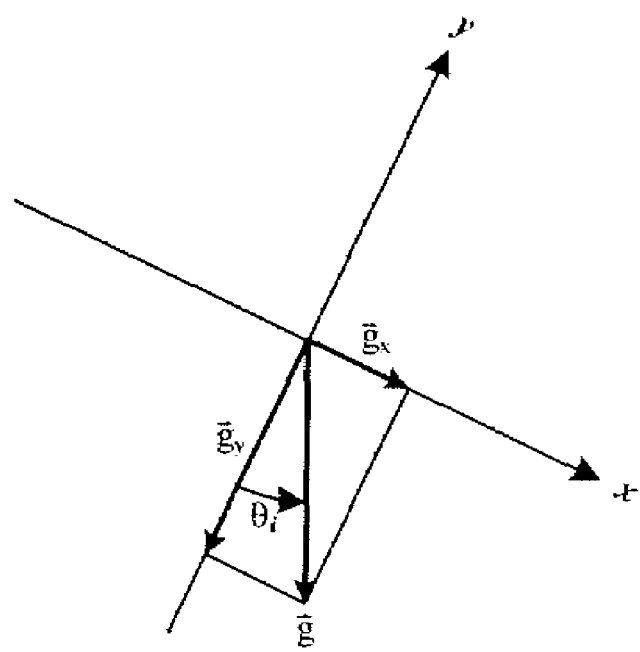
FIG. 5 is a graph which is a Projection of gravity onto the coordinate system of FIG. 4, rotated by an angle $-\theta_i$ about the origin.

Determination of Inclination Angle. Determining the amount an arbitrary surface is inclined requires decomposing the gravity vector into its projections along the x and y axes, as shown in FIG. 5. One represents the inclination of arbitrary surfaces with $\theta_i$:

$$g_x = g \sin \theta_i \tag{6-2}$$

$$g_y = g \cos \theta_i \tag{6-3}$$

For a device which will not be used to detect angles in all four Cartesian quadrants (i.e., the device cannot determine when it is positioned upside down), one can use either Equations 6-1 or 6-2. Furthermore, for a device sensitive to small angle changes about $\theta_i = 0$, a function is wanted with maximum sensitivity in this range of small angles. Equation 6-2 fits these requirements. A cosine function is relatively insensitive to changes in angle about $\theta_i = 0$.

Detailed System Response

Many acceleration sensors, the ADXL322 for example, produce a voltage, linearly proportional to the acceleration it is experiencing. This voltage, V(a), generated in response to an acceleration, a, is characterized as $$V(a) = Ba + C \tag{7-1}$$

where B and C are constants. Included in this response is the linear behavior of the subsequent signal conditioning block shown in FIG. 3.

The ADC is also assumed to convert voltage to ADC "counts" linearly. Counts, $\Psi(V)$ generated in response to an applied voltage, V are characterized as $$\Psi(V) = rV + s \tag{7-2}$$

where r and s are constants.

Combining Equations 7-1 and 7-2 and combining constants, the net response of the ADC, $\Psi(a)$, to an acceleration, a, is given by $$\Psi(a) = pa + q \tag{7-3}$$

where p and q are the combined constants.

Substituting Equation 6-2, the projection of gravity onto the x-axis, into Equation 7-3, there is obtained the net response of the system to a change in inclination angle in the x direction:

$$\Psi_x(\theta) = gp_x \sin \theta + q_x \tag{7-4}$$

Calibration

Equation 7-4 introduces two constants into the calculation of inclination angle: The conversion amplitude, $p_x$ and the conversion offset, $q_x$. Both of these quantities must be calibrated to produce an accurate and reliable result.

Figure 6:
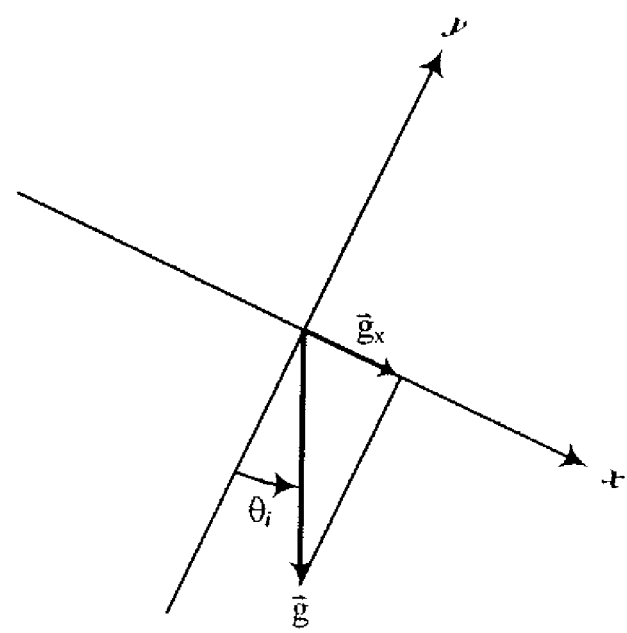
FIG. 6 is a graph showing a first calibration step used in the invention. The inventive device is aligned to an arbitrary surface with an inclination of $-\theta_i$.
Figure 7:
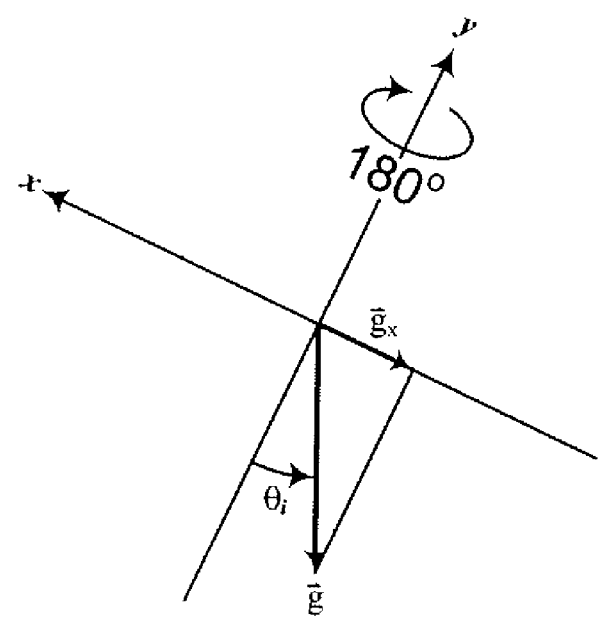
FIG. 7 is a graph showing a second calibration step. The inventive device is rotated by 180° degrees about the y-axis. Note that the inclination angle, from the point of view of the pitch meter, is $+\theta_i$.

Procedure. Calibrating the device may be performed with a three step process. The surface used should be reasonably close to level. It need not be perfectly level as deviations will be averaged out. The device must also be aligned to that surface in some repeatable fashion, most likely with an edge, which will be inclined with some inclination angle, as shown in FIG. 6. At this point, the ADC is read and the value stored. The device is then rotated by 180° about the y-axis, such that the x-axis points in the opposite direction, as shown in FIG. 7. The device is then aligned with the same point on the surface indicated in the first step. The ADC is read again, and the value stored. Finally, the x-axis is aligned with the direction of gravity, within a few degrees, as shown in FIG. 8, and the ADC read again and the value stored. The conversion amplitude and offset can then be calculated.

Figure 8:
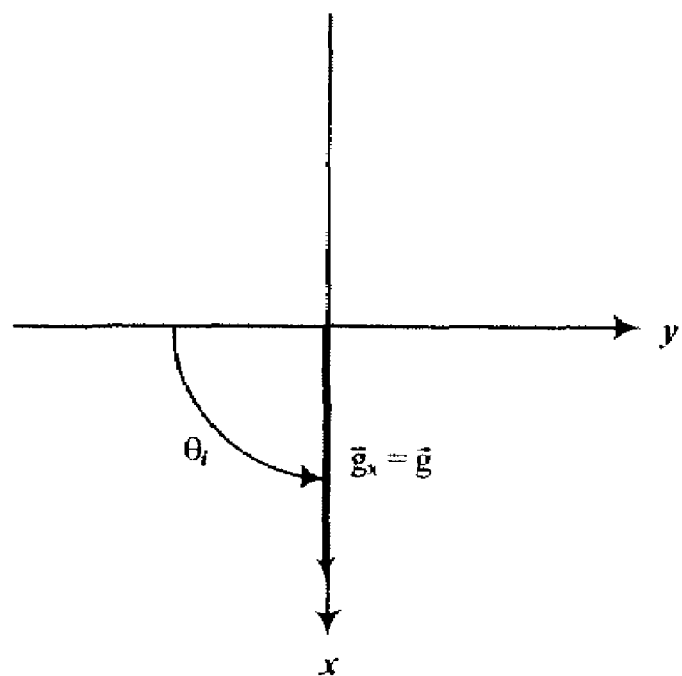
FIG. 8 is a graph showing a third calibration step. Gravity is aligned with the x-axis.

First, second and third calibration steps are performed as shown in FIGS. 6, 7 and 8 respectively.

Calculation of Conversion Offset, $q_x$ Using the first two calibration steps, there are obtained ADC outputs of $\Psi_{x_1}$ and $\Psi_{x_2}$ corresponding to $-/+\theta_i$, respectively. Substituting these values into Equation 7-4, one finds:

$$\Psi_{x_1}=gp_x\sin(-\theta_i)+q_x \quad (8\text{-}1)$$

$$\Psi_{x_2}=gp_x\sin(+\theta_i)+q_x \quad (8\text{-}2)$$

Adding $\Psi_{x_1}$ and $\Psi_{x_2}$ and solving for $q_x$, one finds the offset coefficient, $$\Psi_{x_0}=q_x=(\Psi_{x_1}+\Psi_{x_2})/2 \quad (8\text{-}3)$$

The measured offset coefficient is referred to as $\Psi_{x_0}$.

Calculation of Conversion Amplitude, $p_x$. Examining the case where the gravity vector is parallel to the x-axis, $\theta=-\pi/2$, the response of the system is found to be entirely due to the effect of gravity. This response is labeled, $\Psi_{x_g}$. Using this condition with Equation 7-4, one finds the slope coefficient $$p_x=(\Psi_{x_0}-\Psi_{x_g})/g \quad (8\text{-}4)$$

Calculation of $\theta_i$. Substituting Equations 8-3 and 8-4 into Equation 7-4, one finds the calibrated system response:

$$\Psi_x(\theta_i)=(\Psi_{x_0}-\Psi_{x_g})\sin\theta_i+\Psi_{x_0} \quad (8\text{-}5)$$

Solving for $\theta_i$, the general formula for the inclination angle is:

$$\theta_i=\arcsin[(\Psi_x-\Psi_{x_0})/(\Psi_{x_0}-\Psi_{x_g})] \quad (8\text{-}6)$$

Based on the operating principles set forth above which the present inventor has discovered and invented, an inventive measurement device may be readily built from off-the-shelf components manufactured by major electronics manufacturers.

Advantageously, inventive electronic devices for angle measurement may require less skill to use, increase accuracy and produce more repeatable measurements than conventional mechanical, non-electronic devices for angle measurement.

Examples of applications for inventive devices, systems and methods include, e.g., measurement of "stern pitch" and "lateral pitch" in the sport of flat-water rowing; pitch measurements of helicopter rotors; fan blade pitch measurements and anti-rollover indicators for off-road vehicles; etc. The invention is not restricted to the uses and applications mentioned herein. Inventive devices may be applied to any relative angle measurement between two surfaces of any mechanical, industrial, recreational, etc. application that requires accurate measurement of a relative angle.

The following examples are for illustration and the invention is not limited thereto. It will be appreciated, for example, that dimensions, materials, etc. in the inventive devices may be varied.

EXAMPLE 1

An Application to Flat-Water Rowing Shells

Figure 1:
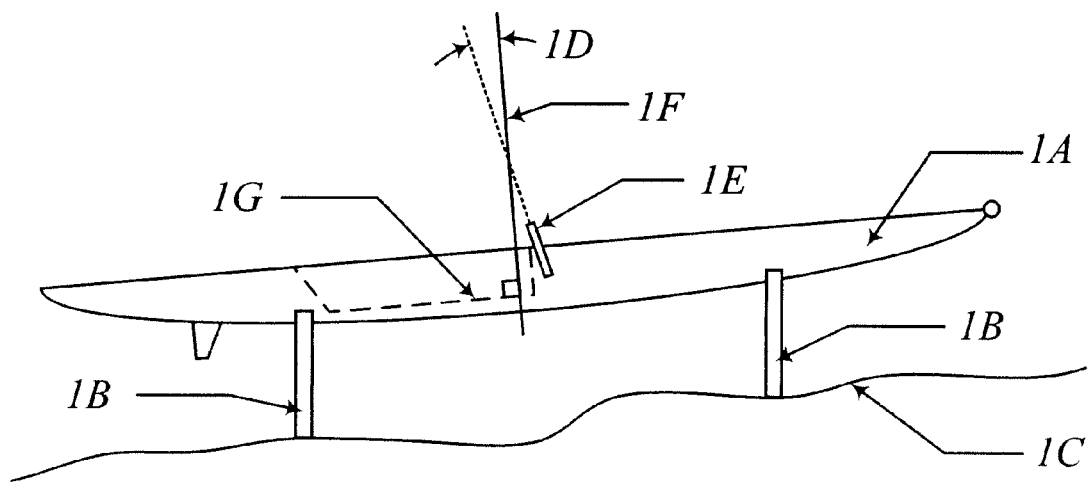
FIG. 1 is a cross-sectional view of a flat water rowing shell with reference to which an inventive application of relative angle measurement to the sport of flat-water rowing may be discussed. A rowing shell, 1A, is supported by slings, 1B, on uneven terrain, 1C. The stern pitch of the rigging, angle 1D, is measured between the perpendicular, 1F, to the keel 1G of the boat, and the pin 1E the oarlock rotates around.

One of the most common, critical and difficult measurements when setting up a flat-water rowing shell is the measurement of stern pitch. A typical situation is shown in FIG. 1. A flat-water rowing shell 1A is set up on supporting "slings," 1B, on uneven, sloping terrain, 1C, pictured in FIG. 1 with the bow of the shell 1A pointed up the slope. Pictured in FIG. 1 is a single scull, however this situation is applicable to double, quadruple and octuple sculls, as well as sweep rowing shells such as pairs, fours and eights. The stern pitch of a shell 1A's rigging, angle 1D, is measured between the pin 1E around which the oarlock rotates, and a perpendicular, 1F, to the keel 1G of the shell 1A, at the midpoint of the shell.

The difficulty in measuring the stern pitch is that in the field, a rowing shell 1A will be rigged on sloping ground, as can be see in FIG. 1. If a simple measurement of the angle between the local direction of gravity and the pin 1E were taken, an error equal to that the amount the shell 1A is sloped would be introduced. Therefore, one should zero their measurement device relative to keel 1G of the boat 1A before measuring the stern pitch of the pin 1E. Because the keel 1G also slopes as it approaches the ends of the shell 1A, the measurement device is zeroed half way between the bow and stern, in either the foot-well or on the underside of the shell 1A. Once the measurement device is zeroed, it can be transferred to the pin 1E and the true stern pitch can be measured.

EXAMPLE 1A

Inventive Device

Referring to FIG. 2, the inventive device 2 of this Example 1A is shown. The outer housing is made of plastic or metal, having dimensions of roughly three inches long, two inches tall and the body is one inch thick. This housing encloses the electronics. On the top face of the housing, an LCD display, 2A, and button 2B to zero or calibrate the device, protrudes through the box. The bottom 2C of the device 2 is placed against the keel 1G (FIG. 1) of the shell 1A, and may have two ridges, at opposite ends of the face, to provide two accurately aligned surfaces for the device 2 to rest on. A triangular notch, 2D, is recessed into one face with the purpose of providing surfaces for the pin 1E (FIG. 1) to rest against.

A clamping arrangement (not shown in FIG. 2) preferably may be included in the device 2 to allow the user to clamp the measurement device 2 to the pin 1E (FIG. 1) and have both hands free to adjust the rigging of the shell. Examples of a clamping arrangement are, e.g., a clamping assembly comprising a "hook" (such as a spring-loaded hook) (see FIGS. 10-10A); a clamping assembly comprising holes (see FIGS. 11-11A); etc.

Referring again to FIG. 2, A tab, 2E, is provided to hold against the inside of an oarlock to allow the user to adjust the rigging without disassembling the oarlock.

Referring again to FIG. 2, a door 2F for the battery compartment is included to allow the user to change batteries. A device reset button may be accessible through the battery compartment.

EXAMPLE 1B

Device Usage

The device 2 is used as follows. Referring to FIG. 2, the bottom face, 2C, of the device 2 is placed on the keel of the rowing shell. When stable, the user presses the button, 2B, located on the top of the device 2. The device 2 measures the angle of the keel, relative to gravity, and stores the result. All subsequent angles displayed by the device 2 are measured relative to gravity and referenced to the first measurement, and the device 2 continually displays this angle. To measure the stern pitch, the user places either the tab, 2E, against the oarlock, or places the triangular notch, 2D, against the pin.

If the user wants to reset the reference surface, the user repeats these steps outlined above in this Example 1B.

These steps in this Example 1B are without regard to the type of rowing shell being measured.

EXAMPLE 1C

The inventor has constructed a prototype device and it has performed as described hereinabove. There is a great need for improvement to conventional pitch measurement devices. For measuring pitch, conventional mechanical devices are difficult to use and require significant skill and repetition to produce accurate measurements that can be reliably duplicated. The prototype constructed solves many of these problems by incorporating state of the art electronics measurement devices with a simple user interface to create an easy to operate device which is a more accurate, reliable and repeatable measurement device.

EXAMPLE 2

Clamping

Figure 10:
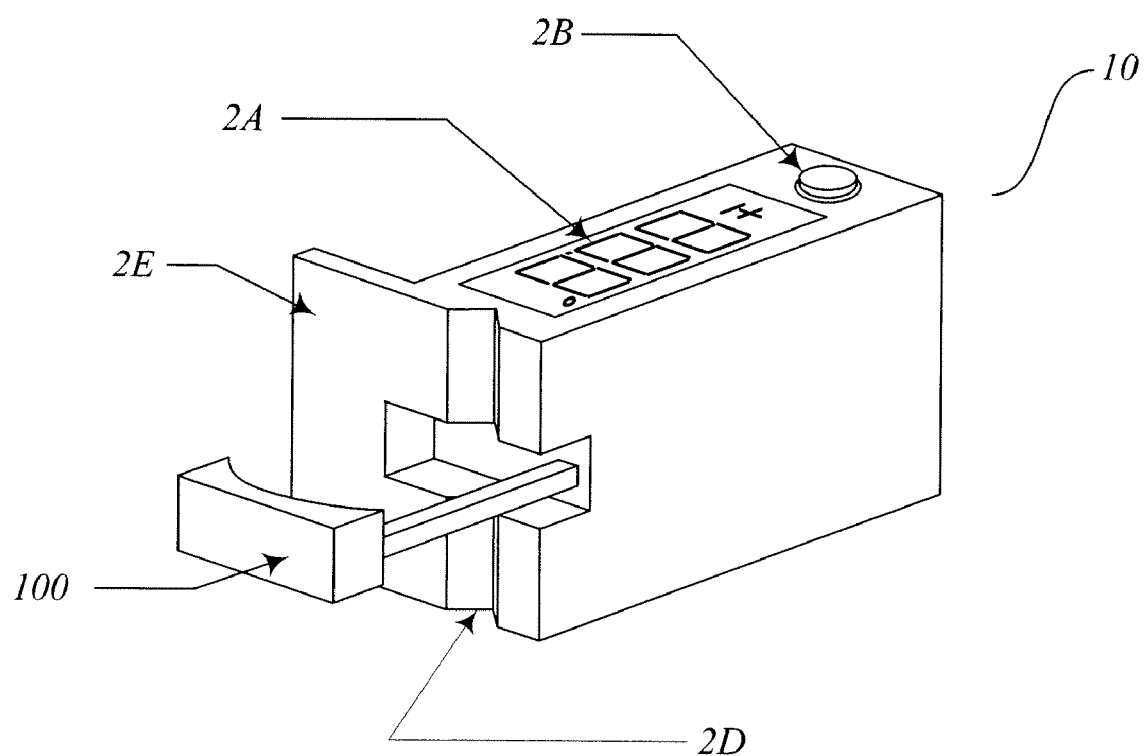
FIGS. 10-10A and 11 are perspective views of inventive devices like the device 2 of FIG. 2 wherein the inventive device is clampable, in assembled (FIG. 10, FIG. 11) and exploded (FIG. 10A) views, with FIGS. 10-10A relating to one clamping embodiment and FIG. 11 relating to another clamping embodiment.

Referring to FIG. 10, which includes a reverse view of the inventive device 2, there may be appreciated an exemplary design for a clamping assembly useable in the invention. A spring-loaded hook 100 can be drawn out of the device 10 and retracts to pull an item (such as the pin 1E) into the groove 2D, thus securely holding the device to the item (such as the pin 1E).

Figure 10A:
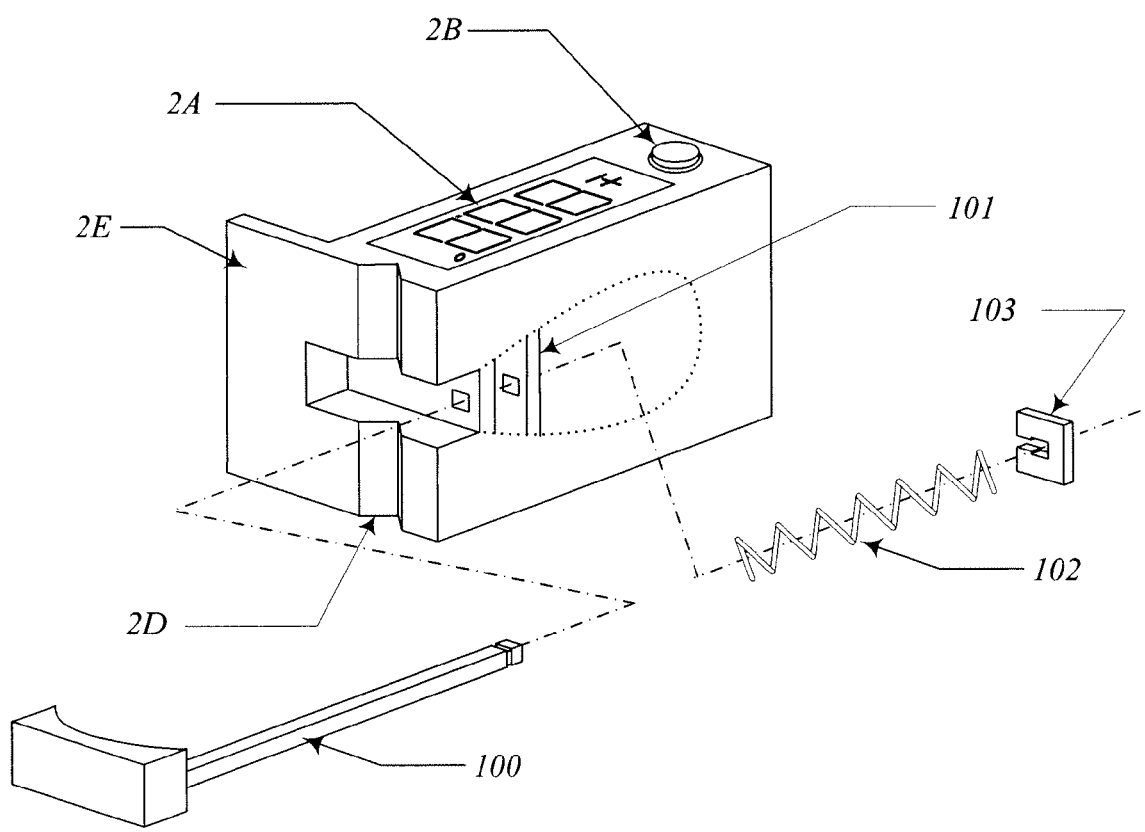

Referring to FIG. 10A, which is an exploded view corresponding to FIG. 10, the hook 100 slides through holes in the exterior of the device case and interior partition 101 through a spring 102, and finally a retaining clip 103 is attached to the end of the hook 100 to retain the spring 102 and secure the hook 100 such that the hook 100 cannot be withdrawn from the device 2.

A device 10 comprising such a clamping assembly comprising a hook may be used by extending the hook 100 sufficiently to be placed around an item (such as pin 1E). The user places the item (such as the pin 1E) in groove 2D and releases the hook 100 such that the hook 100 secures the device 10 to the item (such as the pin 1E). Such a method works for various-sized pins and other to-be-clamped items, and the device 10 may thereby be held as desired such as held against the interior face of an oarlock.

Figure 11:
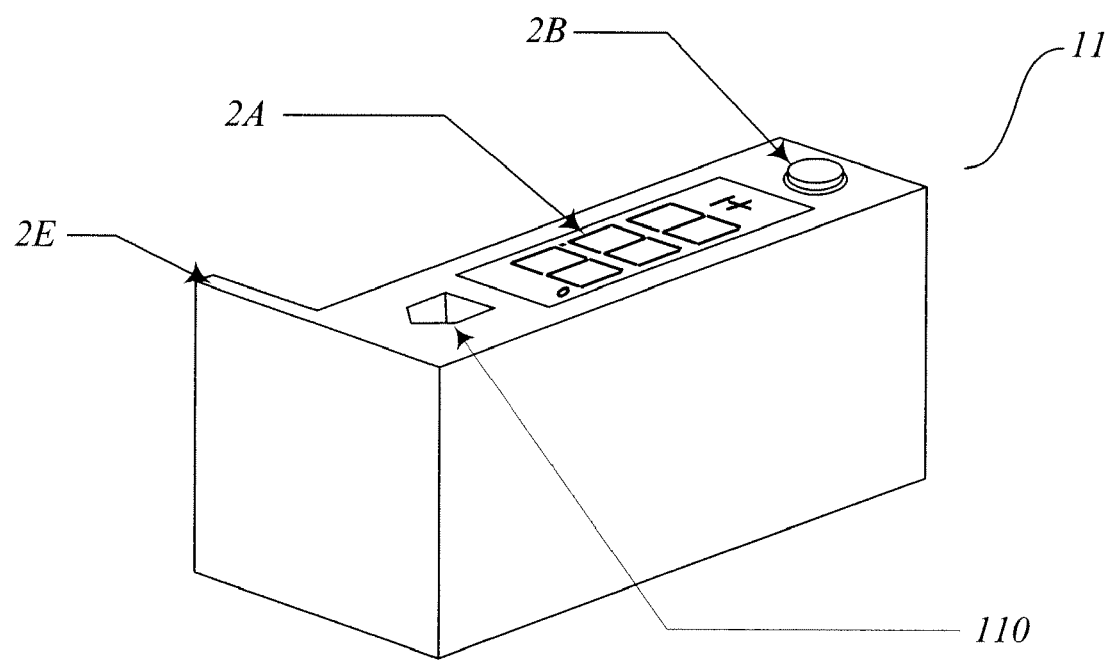

Referring to FIG. 11, an inventive device 11 is shown in which an alternative clamping method, a "hole" clamping method, is used. The housing of device 11 extends (such as by approximately 1 inch) beyond the LCD display. Hole 110 extends through the device 11 from the top to the bottom. Although hole 110 is shown in FIG. 11 as pentagon-shaped, it will be appreciated that hole 110 may be otherwise-shaped.

Figure 11A:
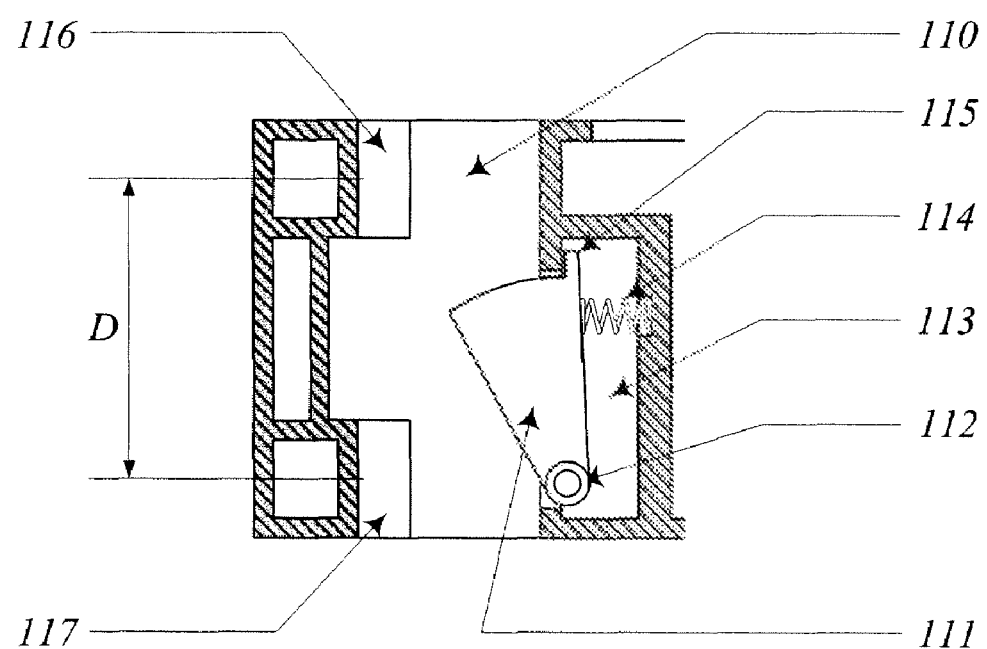
FIG. 11A is a cross-sectional view of the clamping device of FIG. 11, the view being through hole 110.

FIG. 11A is a cross-sectional view through hole 110. A cleat 111 is positioned opposite of the v-shaped groove 2D in hole 110 and rotates around pivot point 112. A spring 114 provides the necessary force to hold cleat stop 115 against the inside of cleat chamber 113. Alternatively, a torsion spring (not shown) around pivot point 112 can replace spring 114. The back wall of the cleat chamber provides a stop which prevents the cleat 111 from being pushed into the cleat chamber 113.

As the pin 1E enters hold from the bottom, the cleat 111 is pressed into the cleat chamber 113. The restorative force of the spring (either linear spring as shown, or torsion spring) provides the force necessary to keep the pin 1E in the v-shaped registration groove. Note that the spring does not need to be strong enough to hold the invention from sliding up and down (this note regarding strength applies to the hook method too).

A v-shaped groove is preferred over circular hole or other shapes to provide better registration of the device to the pin. Also, it can better accommodate various sizes of pins. It is not necessary for the v-shaped registration groove (for either clamping method) to run from the top to the bottom of the device. Rather, two co-linear v-shaped registration grooves are preferred, one at the top of the device, 116 and one at the bottom, 117, spaced apart a distance, D (FIG. 11A) approximately the same distance as the pin mating surfaces of an oarlock.

EXAMPLE 3

Rowing Uses for the Gravity Referenced, Electronic Relative Angle Measurement Device)

A relative angle measuring device such as device 2 (FIG. 2) has many uses. For the sport of flat water rowing, four tasks for which an inventive device such as device 2 can be used are as follows.

1. Measurement of Stern Pitch.

The measurement of stern pitch is described in detail in Examples 1-1C above.

2. Measurement of Lateral Pitch

Lateral pitch in a rowing shell is deviation of the oar lock pin, as described in Examples 1-1C herein, from the perpendicular to an imaginary line between the rigger attachment points, in the direction perpendicular to the length of the rowing shell.

Lateral pitch is measured by zeroing the pitch meter on a flat surface placed across the top of the rowing shell. The device is then placed against the pin oriented perpendicular to the shell.

3. Measurement of Oar Blade Pitch

The pitch of an oar blade is measured between the outer most edge of the oar blade perpendicular to the length of the oar shaft and the flat surface on the oar sleeve parallel to the face of the oar blade.

Typically, an oar is set on a flat surface with the outmost edge of the oar blade on the surface. The flat surface thus becomes a reference surface on which a pitch meter can be zeroed. With a zeroed pitch meter, the relative angle between the oar blade and the sleeve can be measured by placing the pitch meter on the sleeve, perpendicular to the length of the oar.

4. Foot Stretcher Pitch

The foot stretchers are the device in a rowing shell against which a rower presses his feet during a rowing stroke. A foot stretcher typically consists of a flat surface made of wood, fiberglass or composite material, supported at approximately a 45 degree angle, relative to the keel of the boat. The device which supports the foot stretchers also allows for adjustment of the angle of the foot stretcher, relative to the keel of the boat, about 45 degrees. It is this angle, between the keel of a shell and the foot stretcher, which can be measured by an inventive device such as device 2.

A prototype constructed by the inventor allows for measurement of angles within approximately ±20 degrees around horizontal. One approach to allow for measurement of larger angles than ±20 degrees is to select electronics appropriate for measurement of larger angles. For this case, the device would be zeroed on the keel of the shell, then held against the foot stretcher to determine pitch. Another approach to allow for measurement of larger angles than +20 degrees is to supply a 45 degree "wedge" which either attaches to the bottom of the device or extends from the bottom of the device. For this case, the device would be zeroed on the keel of the shell, then the 45 degree wedge inserted or extended and, finally, held against the foot stretcher to determine pitch.

EXAMPLE 4

Accuracy/Small Size

Most conventional mechanical pitch meters are thin (⅛-¼ inch) metal or plastic, and are accurate to 0.5 degrees. To achieve a 0.1 degree accuracy, these conventional mechanical pitch meters would have to be scaled up to be 5 times longer than its current size (~3-6 inches long) which is for accuracy to 0.5 degrees, which would make them 15-30 inches long, which would be too big, cumbersome and unwieldy to be useful.

By contrast, an inventive electronic angle measurement device according to this example provides accuracy to a tenth of a degree, in a package size on the order of approximately 3 inches long by 2 inches tall by 1 inch thick.

EXAMPLE 5

Common Level

An inventive electronic angle measurement device (such as a device according to Examples 1-2) in addition to being useable as a pitch meter in the applications in Examples 1-2 may be set to behave like a common level, by setting the angle of the reference relative to gravity to zero. Thus, one device may be used, for example, as both an electronic pitch meter for rowing equipment and when re-set may be used as a common level (such as for hanging items in home improvement or decorating).

While the invention has been described in terms of preferred embodiments, those skilled in the art will recognize that the invention can be practiced with modification within the spirit and scope of the appended claims.

Having thus described my invention, what I claim as new and desire to secure by Letters Patent is as follows:

1. An electronic method of measuring an angle selected from the group consisting of an angle in rowing equipment and an angle between surfaces which are not physically attached to each other, comprising:

for a to-be-measured angle, wherein the angle is between a first non-body surface and a second non-body surface, neither surface being parallel or perpendicular to direction of gravity; measuring the to-be-measured angle;

wherein the step of measuring is selected from the group consisting of:

electronically measuring an angle in rowing equipment and electronically measuring an angle wherein the first surface and the second surface are not physically attached;

the measuring step being performed by an electronic device, wherein the first surface and the second surface are not physically attached or in close proximity to each other.

2. A pitch meter, comprising a physical structure insertible into a to-be-measured angle in a piece of equipment selected from the group consisting of: rowing equipment; helicopter rotors; fan blades and an automotive vehicle; wherein the pitch meter is electronic;

including a single acceleration sensor.

3. An electronic method of measuring an angle selected from the group consisting of an angle in rowing equipment, an angle between surfaces which are not physically attached or in close proximity to each other, an pitch in helicopter rotors and fan blade pitch, comprising:

for a to-be-measured angle, wherein the angle is between a first non-body surface and a second non-body surface, neither surface being parallel or perpendicular to direction of gravity;

measuring the to-be-measured angle; wherein the step of measuring is selected from the group consisting of: electronically measuring an angle in rowing equipment; electronically measuring an angle wherein the first surface and the second surface are not physically attached or in close proximity to each other; electronically measuring pitch in helicopter rotors: and electronically measuring fan blade pitch;

the measuring step being performed by an electronic device, wherein only a single acceleration sensor is used.

4. An electronic method of measuring an angle, the method performed within an electronic device that comprises an Analog to Digital Converter and that has an x-axis and v-axis, said method comprising:

calibrating by the electronic device comprising obtaining data which are processed into constants; wherein the calibrating comprises:

(A) (1) taking a to-be-stored first Analog to Digital Converter value, wherein the device is on a reasonably-close-to level surface during the taking step (1); (2) taking a to-be-stored second Analog to Digital Converter value, wherein during said taking step (2) the device is rotated by 180 degrees about the y-axis, with the x-axis pointing in an opposite direction, and aligned with where on the surface the device was in step (1);(3) taking a third to-be-stored Analog to Digital Converter value, wherein during taking step (3) the device is aligned with a direction of gravity within a few degrees; and further comprises, storing the to-be-stored values of steps (1), (2) and (3); or (B) the electronic device's obtaining data which are processed into a conversion amplitude constant $p_x$ and a conversion offset constant $q_x$; followed by, for a visually-identified to-be-measured angle between a first non-body surface and a second non-body surface, neither surface being parallel or perpendicular to direction of gravity, electronically measuring the to-be-measured angle.

* * * * *